3,610,075
METHOD OF PRODUCING A PLURALITY OF CUTTING TOOLS FROM A SINGLE FLUTED BAR
Edward F. Fabish, Glenview, Ill., assignor to Illinois Tool Works Inc., Chicago, Ill.
Original application July 1, 1968, Ser. No. 741,415, now Patent No. 3,483,605, dated Dec. 16, 1969. Divided and this application Sept. 12, 1969, Ser. No. 857,444
Int. Cl. B21k *21/00*
U.S. Cl. 76—108 T 5 Claims

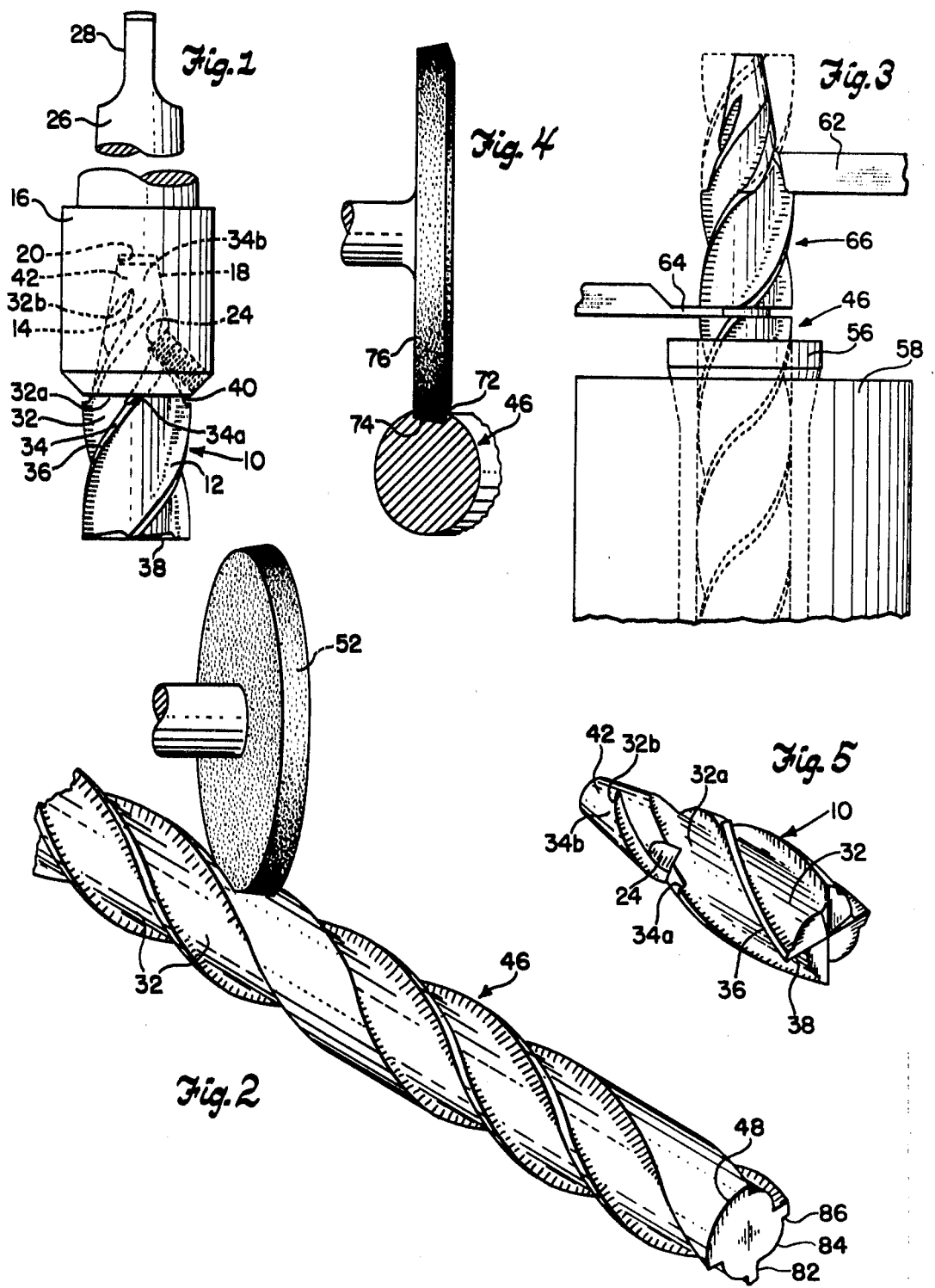

ABSTRACT OF THE DISCLOSURE

A plurality of blanks for a "throw-away" cutting tool such as an end mill having a short, tapered shank adapted to be held in a correspondingly tapered holder can be produced from a single length of bar material by first forming at least three flutes in the bar and then tapering and cutting off individual blanks in an automatic screw machine. The cutter blanks are finished by hardening them and then sharpening their cutting surfaces while holding them in a tapered holder.

---

This application is a division of Ser. No. 741,415 filed July 1, 1968, now Pat. No. 3,483,605, issued Dec. 16, 1969.

BACKGROUND OF THE INVENTION

Field of the invention

This invention relates to fluted cutting tools and more particularly to a method for making a plurality of such tools from a single fluted bar.

Description of the prior art

Tools having rather tapered shanks which are adapted to be held in correspondingly tapered holders are known in the prior art as exemplified by U.S. Pats 1,461,548 and 2,283,514 to C. A. West and A. Stanworth, respectively. These patents point out that the cost of such tools may be reduced considerably over conventional tools since they utilize a relatively small amount of costly high speed or special alloy steel. The savings in material is possible due to the fact that the holder may be made of less costly steel or other material than the cutters.

Although tools of the type just mentioned do result in lower manufacuring costs due to savings in the cost of materials, such savings in materials are not particularly significant unless the labor required to manufacture the tool can also be reduced considerably. Because the prior art tools which are adapted to be used as inserts in holders are generally made by the same methods used to make ordinary tools which are self supporting, it has not heretofore been possible to achieve a true "throw-away" tool which can be produced at a cost significantly lower than an ordinary tool such that it would be more economical to replace the tool with a new one than to resharpen it.

Although the concept of manufacturing a plurality of twist drills from a singe piece of bar stock by heating the bar, mechanically working it to form longitudinal flutes in it and then twisting it is shown in U.S. Pat 2,457,132 to H. W. Delaney, this teaching could not produce the cutter blanks produced by the process of the present invention.

SUMMARY

It is an object of this invention to provide a fluted cutting tool which may be produced quite economically and which, although it can be resharpened in the same manner as a conventional cutter, can be sold for a cost sufficiently low that it would, in many cases, be more economical to throw away the cutter without resharpening than to purchase a conventional cutter and resharpen it.

It is another object of this invention to provide a fluted cutter which has portions of its land areas between its flutes which extend into its shank portion and serve as surfaces for supporting the cutter in a tapered holder into which the shank is inserted.

Still another object of this invention is to provide a method of making a plurality of tapered shank cutter blanks by mounting a long fluted bar of material in a tapering and cutting device such as an automatic screw machine which progressively tapers the shanks of, and cuts off the individual blanks. Such blanks can then be hardened and sharpened to become commercially suitable cutting tools.

These objects are obtained by the cutting tool and method of the present invention. The cutting tool, which is preferably an end mill, includes side and end cutting portions and a shank portion adapted to be received in a socket or holder member. The cutter is held in the socket member by a retaining means such as a set screw which is threaded through the socket member and presses against a notched surface on the shank of the cutter for driving the cutter axially into tighter and tighter engagement with the socket member and for preventing rotation relative thereto. The socket member is adapted to be mounted in and driven by the chuck of a milling machine and for this purpose may include a Morse taper shank although obviously, other driving configurations could be used.

The cutting tools are formed from blanks which are cut off from a length of fluted bar material such as high speed tool steel. The steel bars are preferably fluted along their entire length. Although a 25 inch bar has been found satisfactory, any length bar can be used depending upon the capacity of the forming apparatus employed. The fluting may take place in a variety of ways such as by grinding, milling, rolling or forging. The flutes preferably have a constant helical lead and a constant root diameter throughout the length of the bar. After the bar is fluted it is preferably placed in a long support collet in an automatic screw machine. The collet preferably has a length considerably longer than the diameter of the bar since the bar is only supported on the relatively narrow land areas which are formed between the flutes and which constitute the outer diameter of the surface of the bar. In order to produce a cutter blank, a short length of the fluted bar is moved outwardly through the collet against a stop member. As the bar is rotated, a tapered turning tool is moved radially inwardly to the end of the bar until the terminal end of the shank is formed at which time the tapering tool is moved in an axial direction toward the collet and radially outwardly of the bar. A second forming tool is used to cut off the cutter blanks from the remaining stock in the collet. To achieve maximum production the cut-off tool may operate simultaneously with the tapering tool.

After the cutter blank is formed, it is then hardened, heat treated and sharpened in a holder having a taper corresponding to the shank taper. The retaining notch is preferably formed in the tool shank after hardening.

BRIEF DESCRIPTION OF THE DRAWINGS

FIG. 1 is a top plan view of a finished cutting tool of the present invention showing the cutting tool in locked position in an appropriate holder having an elongated tapered shank;

FIG. 2 is a perspective diagrammatic showing which illustrates the method step of forming flutes in a long piece of round bar stock by grinding;

FIG. 3 is a top plan view which diagramatically illustrates the additional method steps of tapering and cutting off individual tool blanks from a long piece of fluted bar material formed in accordance with the method of FIG. 2;

FIG. 4 is an edge plan view of the grinding wheel and a cross section of the rod shown in FIG. 2 showing the shape of the flutes;

FIG. 5 is a perspective view of the finished cutter shown in FIG. 1.

DESCRIPTION OF THE PREFERRED EMBODIMENT

In FIG. 1, a finished cutting tool indicated generally at 10 and having a cutting portion 12 and a shank portion 14 is shown mounted in a sprocket or holder member 16. A tapered shank surface 18 on the cutter 10 corresponds with a similarly tapered surface 20 on the inside of socket member 16 to firmly engage and center the cutting tool 10. The angle chosen for surfaces 18 and 20 can be varied depending upon the degree of locking which is desired. By utilizing taper angles less than about 7½ degrees it has been found that locking of the shank 18 to the holder 16 will take place so as to necessitate the provision of either an axial or radial hole through the holder 16 to permit the insertion of a drive pin (not shown) for knocking out the cutting tool when it must be replaced or resharpened. By utilizing a taper angle over 7½ degrees, the cutting tool and holder will not firmly lock together and the cutting tool may easily be released by tapping the holder. A taper angle of 11 degrees for the surfaces 18 and 20 has been found particularly satisfactory. The cutting tool 10 is held in rigid engagement with the socket member 16 by a retaining means such as set screw 22 which is in threaded engagement with holder 16 and which engages a notched surface 24 in the shank 14. The notched surface 24 is preferably formed at an angle which will cause the set screw 22 to exert an axial component of force on the shank to hold it in the socket and also prevent its rotation in the socket. The socket or holder member 16 is provided with a conventional shank such as a Morse taper shank 26 including a tang portion 28 which may be inserted in a milling machine chuck for driving the cutting tool.

The cutting portion 12 of the cutting tool 10 includes a plurality of flutes 32, and preferably three or more for reasons to be described hereinafter. The flute portions 32 are separated from each other by land portions 34 including longitudinally extending cutting edges 36. The longitudinal cutting edges 36 are side cutting edges which coact with end cutting edges 38 to permit the cutter to be moved transversely through a piece of material to be cut (not shown) so as to form slots therein or to otherwise remove material therefrom.

The cutting tool 10 is relieved at an intermediate portion 40 thereof which separates the shank portion 14 from the cutting portion 12. The relieved portion 40 insures that the side cutting edges 36 are clearly defined in relation to the remainder of the land portion 34 which continue from the cutting portion 12 of the cutter into the shank portion 14. This relieved portion 40 also provides clearance for the grinding wheel used to sharpen cutting edges 36.

As can be seen in FIG. 1, the flute portions 32 continue from the cutting portion 12 of the cutter into the shank portion 14. It will be noted that the flutes 32, which have a constant root diameter, become progressively narrower as they proceed along the shank portion 14 from a point 32a at the intermediate relieved portion 40 to a point 32b at the terminal end portion 42 of the shank wherein they disappear due to the diameter of the shank becoming reduced below the root diameter of the flutes. Necessarily, the land portions 34 become progressively wider as they proceed along the shank from point 34a to point 34b.

Since the narrow land portions 34a provide much of the shank area which supports the tool in its socket or holder, it is important that the support be as firm as possible. By providing three or more spaced land portions on the tool shank the shank is able to provide a firm and equal support for the tool. If only two lands were provided the tool could possibly rock in its holder.

FIG. 2 diagrammatically shows one step in my method of forming the cutter shown in FIG. 1. An elongated piece of bar material indicated generally at 46 which preferably has a circular surface 48 is moved axially and rotationally relative to a forming means such as the grinding wheel 52 to produce a plurality of flutes 32 which have a constant angle of lead and a constant root diameter. The particular structure used to mount the bar 46 for grinding the flutes is not shown since it is conventional and forms no part of the present invention. Such a grinding structure would of course include means for engagig oe end of the bar 46 ad rotating it while moving it axially relative to the grinding wheel. In tests, satisfactory fluted bars have been produced by utilizing a 25-inch length of bar stock and cutting flutes therein which have a 30-degree helical lead by means of a grinding wheel having its plane of rotation positioned at a 34 degree angle to the axis of the bar 46.

In FIG. 3 the fluted bar 46 produced by the method step depicted in FIG. 2 is diagrammatically shown as mounted in a collet 56 which is supported in a chuck 58 of the type typically found in an automatic screw machine (not shown). A stop member (not shown) on the automatic screw machine may be used to permit an exact length of the bar 46 to be fed outwardly of the collet 56. Once the stop is engaged, the bar 46 is turned while a tapering tool 62 is moved radially into the terminal end of the shank 14 and then moved axially toward the collet and radially outwardly of the bar 46 until intermediate portion 40 is reached at which time the taper tool 62 is withdrawn. Either following the operation of the tapering tool 62, or simultaneously therewith, a cut-off tool 64 is moved radially inwardly of the rod 46 to cut off the tapered tool blank indicated generally at 66.

FIG. 4 is a view of the side edge of the grinding wheel 52 which has been dressed to provide the flute shape shown in FIG. 2. By dressing grinding wheel 52 so that the side and end surfaces 72, 74, 76 have angles of approximately 70 degrees, 12 degrees and 90 degrees from the axis of the grinding wheel it is possible to secure the flute surfaces 82, 84, and 86 shown in FIG. 2.

The cutter blank 66 which is severed from the bar 46 in FIG. 3 must have additional steps performed on it before it becomes the finished cutting tool 10 shown in FIGS. 1 and 5. These additional steps include the steps of hardening and heat treating followed by a sharpening operation. The hardening and heat treating operations are conventional and need not be described herein. Sharpening of the cutter blank 66 to form cutting edges 36 is accomplished in a commercially available sharpening fixture such as, for example, a fixture similar to that disclosed in U.S. Pat. 2,569,855 issued to Carl J. Hertlein. During sharpening, the tool blank 66 is inserted in a holder (not shown) having the same taper as the taper 20 on holder member 16 and is moved axially and rotationally past a grinding wheel (not shown). To guide the tool as it is sharpened, a fixed guide member (not shown) in the fixture bears on a side of a flute at all times.

It will be readily seen that the method just described will enable a large number of cutting tool blanks to be formed from a single fluted bar. Although naturally, the time required to form the flutes in a long bar is much longer than that necessary to form the flutes in a single cutter, there are great savings in the amount of time required to mount the member to be fluted.

I claim:

1. A method of producing a plurality of fluted blanks for cutting tools from a single length of bar material comprising the steps of: forming a plurality of longitudinal flutes of constant lead and constant depth in said length of bar material; forming a tapered shank surface at one terminal end of said fluted bar while forming a relief portion between the tapered shank and a cutting portion; cutting off a short portion of said fluted bar to produce a cutting tool blank having a tapered shank portion at one end and a fluted portion for cutting at the other end; and repeating said steps of forming a tapered shank surface and cutting off a short portion of said length of fluted bar material to produce additional fluted cutting tool blanks until said fluted bar is consumed wherein said tapered shank surface extends from an intermediate region of the fluted blank to a terminal end portion and which surface comprises progressively wider areas of the land surfaces of the bar which separate said flutes from each other as the tapered shank tapers toward its terminal end portion, the diameter of the cutting tool blank at the terminal end portion being less than the root diameter of the flutes such that the terminal end portion of the shank is peripherally continuous and uninterrupted by flutes.

2. A method of producing fluted cutting tool blanks in accordance with claim 1 wherein said flutes are formed in said single length of bar material by grinding.

3. A method of producing fluted cutting tool blanks in accordance with claim 1 wherein said flutes are helical.

4. A method of producing fluted cutting tool blanks in accordance with claim 1 wherein said steps of forming a tapered shank and cutting off take place substantially simultaneously.

5. A method of producing finished cutting tools from the cutting tool blanks defined in claim 1 comprising the additional steps of: hardening the fluted cutting tool blanks; mounting the hardened blank with its tapered shank in a correspondingly tapered holder, and moving the blank relative to sharpening means for sharpening the hardened blank to form cutting edges thereon.

References Cited

UNITED STATES PATENTS

| 2,889,669 | 6/1959 | Babbitt | 51—288 |
| 3,011,367 | 12/1961 | Tilden | 76—108 |

FOREIGN PATENTS

| 56,325 | 11/1912 | Austria | 76—108 T |

BERNARD STICKNEY, Primary Examiner

U.S. Cl. X.R.

51—288